United States Patent [19]

Muramoto et al.

[11] 4,018,312

[45] Apr. 19, 1977

[54] DUO-SERVO PARKING BRAKE

[75] Inventors: Ikuo Muramoto; Hideki Kita, both of Hiroshima, Japan

[73] Assignee: Toyo Kogyo Co., Ltd., Japan

[22] Filed: Dec. 30, 1975

[21] Appl. No.: 645,474

[52] U.S. Cl. .............................. 188/333; 188/325; 192/75; 192/99 B

[51] Int. Cl.² ........................................ F16D 51/22

[58] Field of Search .......... 188/325, 326, 327, 328, 188/331, 333, 336, 337, 106 R, 106 A, 106 F; 192/75, 99 B, 99 S

[56] References Cited

UNITED STATES PATENTS

| 2,006,494 | 7/1935 | Bendix et al. | 188/328 |
| 2,036,385 | 4/1936 | Amirault | 188/325 |
| 2,372,319 | 3/1945 | Francois | 188/326 |
| 3,575,266 | 4/1971 | Sitchin | 18/331 X |
| 3,581,847 | 6/1971 | Torii | 188/106 F X |

*Primary Examiner*—George E. A. Halvosa
*Attorney, Agent, or Firm*—Wenderoth, Lind & Ponack

[57] ABSTRACT

A duo-servo parking brake in which brake shoes are moved into contact with a brake drum on a wheel unit by a four-joint link assembly which is actuated by an actuation cable connecting to a pedal or handle actuable by the driver of a vehicle, and which is so disposed that the actuation cable may be led at a right-angle from the wheel unit and so avoid contact with vehicle suspension elements. Connections of links in the four-link assembly are all rotatory connections, whereby friction and wear of parts are reduced and improved transmission of braking force exerted by the actuation cable is achieved.

5 Claims, 6 Drawing Figures

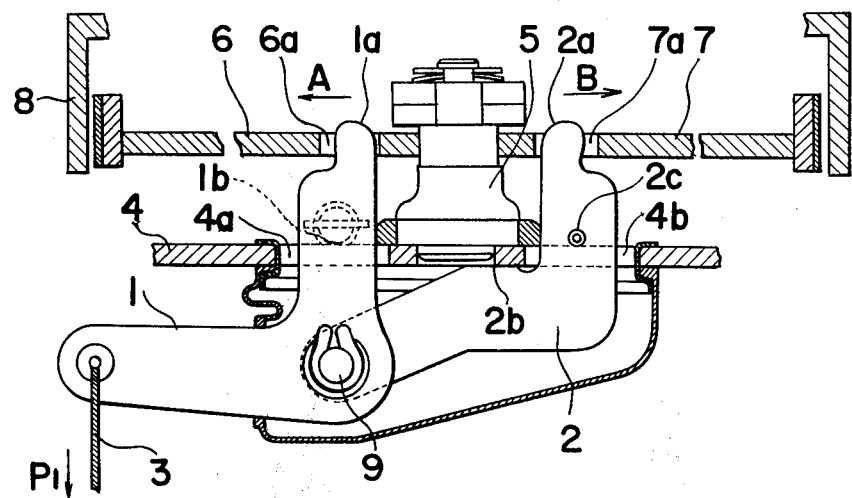

DUO-SERVO PARKING BRAKE

BACKGROUND OF THE INVENTION

The present invention relates to a duo-servo brake. More particularly the invention relates to a mechanically actuated duo-servo parking brake employable independently or in combination with a normal disk brake in an automotive vehicle.

As in drum brakes in general, in a duo-servo brake, usually two shoes, are provided in a rotating drum mounted on a wheel unit, are fitted externally with friction material and may be forced outwards to be brought into pressure contact with the interior of the drum and thereby stop, or prevent, rotation of the drum and wheel unit.

The tips of the shoes are connected by pull-off springs to an anchor pin which is mounted in an upper central portion of the interior space defined by the drum, and may be moved away from the anchor pin, by actuation means described below, counter to the force of the pull-off springs, whereby the shoes are brought into contact with the drum. A distinguishing feature of the duo-servo brake is that the ends of the shoes are connected by a link via which, when the brake is actuated, frictional drag on one shoe, termed the primary shoe, is applied on the other shoe, termed the secondary shoe. This arrangement permits generally equal braking effort for either direction of rotation of the wheel, and also permits production of a high torque output compared to other types of drum brakes. For this reason duo-servo brakes are commonly employed when strong braking power is required for low brake actuation effort.

When, as is common for parking brakes, brake actuation is effected by mechanical means, rather than by hydraulic means for example, brake shoes are contacted or engaged by rigid elements, which are in connection to one another and which as an assembly may be actuated by a cable attached to one of the elements and leading to a parking brake handle or pedal actuable by the driver of a vehicle. For a parking brake which makes use of rear-wheel brake assemblies, the hand brake handle or pedal is provided in the driving compartment of the vehicle and connects to a front cable which leads rearwards and connects, via an intermediate linkage for example, to rear cables connected to the brake shoe actuation assemblies associated with opposite rear wheels. Alternatively, cables may connect directly to the brake handle or pedal. There are two basic dispositions of a rear cable or the end portion of a cable connecting to a brake shoe actuation assembly, one disposition being that each rear cable or end portion of a cable lies generally parallel to the plane of rotation of a drum and wheel unit, and the other that a rear cable or cable end portion lies generally parallel to the rear axle and at a right-angle to the plane of wheel rotation. The former type of disposition is illustrated in FIG. 1 in which a drum brake assembly is shown in the plane of rotation of a wheel unit on which the brake assembly is mounted, rotation being clockwise as seen in the drawing for forward drive of a vehicle of which the wheel unit is a part. The drum brake assembly comprises a pair of shoes A and B which are provided in a drum D. The tips of the shoes A and B are connected by pull-off springs to an anchor pin and the ends thereof are pivoted on and connected by a link, for example an adjustable floating link, and also by a shoe-to-shoe spring. The shoes A and B normally are held out of contact with the drum due to the action of the pull-off springs, but may be moved outwards counter to the force of the pull-off springs and brought into contact with the drum by the action of a generally vertical lever A1 having an upper end connecting to an upper portion of shoe A and a generally horizontal cross-strut B1 having opposite ends connecting to upper end portions of lever A1 and of shoe B. A point P at the lower end of lever A1 is connected to an actuation cable C which extends therefrom in a line generally parallel to the plane of rotation of the drum and wheel unit and leads to a brake lever or pedal and which upon actuation of the brake lever or pedal is pulled forward in the direction indicated by the arrow in the drawing and pivots lever A1 counterclockwise, whereby cross-strut B1 is moved upwards and so forces the shoes A and B away from anchor pin and into contact with the drum to stop rotation of the wheel unit. This arrangement of the brake assembly and disposition of the actuation cable C are very effective in terms of efficiency of transmission of the force of the pull exerted on the cable C, but present problems in terms of installation in a practical vehicle, since while it is necessary that the cable C be generally parallel to the wheel unit, the cable C must not be contacted by or interfere with the various elements of the vehicle rear suspension assembly, and there are thus practical restrictions on mounting and use of such a brake means. Another disadvantage of the arrangement shown in FIG. 1 is that, even supposing that there are no restrictions on mounting of the actuation cable C and that the cable C can be disposed exactly in a required alignment, there is a difference in tautness of the cable C depending on whether the vehicle is travelling forwards or in reverse. This is because when the drum is rotating clockwise as seen in the drawing, i.e., when the vehicle is travelling forwards, as is well known, shoe A tends to be pushed onto the anchor pin while shoe B moves to a position wherein the tip thereof is removed from the anchor pin by a clearance of $\theta°$ measured with reference to the circle defined by the drum D. For optimum braking action during forward motion of the vehicle, the mounting positions of the lever A1 and cross-strut B relative to one another and to the shoes A and B are suitably made such that when the shoes A and B are in the abovenoted positions relative to the anchor pin the lever A1 is generally vertical and the cross-strut B1 is generally horizontal, as indicated by the solid line portions of FIG. 1. When however the vehicle is moved in reverse and the drum D is rotated counterclockwise as seen in the drawing, shoe B is moved counterclockwise to close the clearance $\theta°$ and is brought into contact with the anchor pin. When this happens, since the mounting points of the lever A1 and cross-strut B1 are moved out of their forward drive disposition to a new disposition, as indicated by the dotted line portion of FIG. 1, the lever is pivoted through an angle $\theta°$ and the cable connection point P thereof is thereby moved a distance $\Delta s$ forwards, i.e., towards the brake actuation handle or pedal. In other words, during reverse travel of the vehicle, although the actual length of cable C extending between the brake assembly and the brake actuation lever remains unchanged, the distance over which the cable C is required to stretch is shortened by a distance $\Delta s$, and the cable C is therefore less taut, and the same amount of movement of the brake actuation handle or pedal results in a different braking action depending on whether the vehicle is travelling forwards or in reverse.

To avoid such problems of mounting of and alteration of the tension length of a brake actuation cable it has been known to provide a drum brake actuation means such as shown in FIG. 2. This brake actuation means is disposed horizontally in the upper portion of the interior of a brake drum 8 and comprises a first lever 1 and a second lever 2, both of which have the general shape of a reversed L, as seen from above, each lever 1 and 2 having an inner leg which extends into the drum 8 interior and is generally parallel to the rear axle of a vehicle, the first lever 1 having an outer leg which is generally parallel to the plane of rotation of the drum 8, and the second lever 2 having an outer leg which comprises a base portion which is parallel to the drum rotation plane, and connects to the inner leg of the second lever 2, and an extension portion which is inclined away from the drum rotation plane and extends far enough to underlap the junction of the inner and outer legs of the first lever. The levers 1 and 2 are connected by a connector pin 9 which passes through the outer end of the extension portion of the second lever 2 and the junction of the inner and outer legs of the first lever 1, the levers 1 and 2 being fixedly attached to the pin 9, and the pin 9 being unattached to any other brake elements.

The inner leg of the first lever 1 passes through an opening 4a formed in the backplate 4 of the brake assembly and defines a tip end 1a which extends into a hole 6a which is formed in a shoe 6 near an anchor pin 5 to which the shoe 6 is connected in the manner described above, the shoe 6 being associated with another shoe 7 provided on the opposite side of the anchor pin 5. To one side of the inner leg of the first lever 1 there is affixed a large-diameter support pin 1b which contacts and may slide on an inner surface of the backplate 4. The inner leg of the second lever 2 similarly extends through an opening 4b formed in the backplate 4, defines a tip end portion 2a extending into an opening 7a formed in the shoe 7 near to the anchor pin 5, and has affixed thereto a pin 2c which contacts and may slide on an inner surface of the backplate 4. The inner side of the base portion of the second lever 2 is in sliding contact with an outer wall of the backplate 4 and constitutes a sliding support surface 2b for the second lever 2. Thus the first lever is slidingly supported by pin 1b and the second lever 2 by support surface 2b and pin 2c. Attached to the end of the outer leg of the first lever 1 there is an actuation cable 3 which leads away from the wheel unit at approximately a right-angle thereto, i.e., along a line generally parallel to the vehicle rear axle, and after being passed round a guide, not shown, which is located at a convenient point in the rear portion of the vehicle, is led to and connected to a brake actuation handle or pedal which is provided in the driving compartment of the vehicle, and which when actuated by the driver of the vehicle causes the cable 3 to exert on the first lever 1 a pull P1 directed outwards with respect to the drum brake assembly, as indicated by the arrow in the drawing. This pull P1 causes the first lever 1 to pivot counterclockwise as seen in the drawing, whereby while the support pin 1b slides along the backplate 4 the tip 1a of the first lever 1 is moved in the direction of the arrow A and pushes the shoe 6 into contact with the drum 8. When thus turned, the first lever 1 turns the connector pin 9 to which both levers 1 and 2 are fixedly attached, and the pin 9 exerts a turning force on the second lever 2. However, because of contact of the sliding support surface 2b of the second lever 2 with the backplate 4 the second lever 2 may not be turned counterclockwise, but instead, while guided by the support surface 2b and pin 2c sliding on backplate 4 surfaces, is moved in the opposite direction to the first lever 1, as indicated by the arrow B, whereby the tip 7a thereof urges the shoe 7 into contact with the drum 8, thereby completing brake action.

This arrangement of a drum brake assembly has the advantages that mounting of a brake actuation cable is easier and that any displacement of brake shoes relative to the anchor pin during forward or reverse drive of the vehicle results in only a slight variation of tension in the brake actuation cable, whereby there is little change in the amount of brake handle or pedal effort required to obtain a particular braking force. However, the brake shown in FIG. 2 has a principal disadvantage in that since the levers 1 and 2 are supported by sliding support elements efficiency of transmission of pull P1 is very low, being of the order of 5%, which to some extent offsets the advantage of the duo-servo brake. Another disadvantage of such sliding support is of course that parts are subject to greater frictional wear and hence have reduced service life.

SUMMARY OF THE INVENTION

If is accordingly a principal object of the invention to provide an improved mechanically actuated duo-servo brake employable as a parking brake for an automotive vehicle.

It is a further object of the invention to provide a duo-servo brake wherein the end portion of an actuation cable connecting to a brake actuation means actuable by the driver of a vehicle is led from the main brake assembly along a line generally parallel to the rear axle of the vehicle, thereby avoiding problems of mounting of the cable otherwise liable to be caused by rear suspension elements of the vehicle.

It is a further object of the invention to provide a duo-servo brake wherein there is minimum variation of tautness of an actuation cable during forward and reverse motion of a vehicle.

It is yet another object of the invention to provide a duo-servo brake wherein friction of constituent elements thereof is reduced, whereby wear is reduced and efficiency of transmission of brake actuation force is improved.

In accomplishing these and other objects there is provided, according to the present invention, a mechanically actuated duo-servo brake wherein shoes provided on a brake drum mounted on a wheel unit, for example a rear wheel unit, of a vehicle are caused move to contact the drum and thereby effect braking of the vehicle by a four-link means comprising a primary lever connecting to one end of an actuation cable and pivotal to a position to cause one shoe to move into contact with the drum upon exertion of a pull by the actuation cable resulting from actuation of a brake handle or pedal, which is located in the driving compartment of the vehicle, for example, and which connects to the other end of the actuation cable. A secondary lever is connected to and acts as a support for the primary lever, is moved in an opposite direction to the primary lever when the primary lever is moved by the actuation cable, and when so moved causes the other shoe to move into contact with the drum. First and second link levers are each pivotally mounted at one end thereof to a fixed portion of the drum assembly and at the other end to the secondary lever. The link levers both act as a support to the primary and secondary levers and as a guide to movement of the secondary lever. This four-link means is disposed such that the actuation cable connecting thereto may be initially led at a right-angle from the wheel unit, which offers the principal advantage that mounting of the cable is unhindered by rear suspension elements of the vehicle. All connections in the four-link means are rotary, which offers the further advantage that there is efficient transmission of force exerted by the actuation cable, and that wear of parts is minimal.

BRIEF DESCRIPTION OF THE DRAWINGS

A better understanding of the present invention may be had from the following full description thereof when read with reference to the attached drawings, in which like numbers refer to like parts, and FIGS. 1 and 2 are views of conventional drum brakes referred to in the foregoing description;

FIG. 3 is a horizontal cross-sectional view showing main portions of a duo-servo brake according to one embodiment of the invention;

DETAILED DESCRIPTION OF PREFERRED EMBODIMENTS

Figure 1:
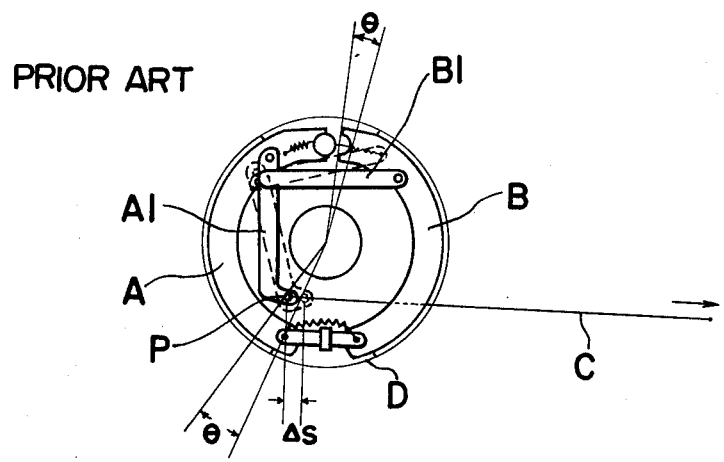

Before proceeding with the description it is to be noted that for the purposes of the present description the terms 'inner' and 'outer', and similar terms, are to mean inner and outer with respect to a space defined by a brake drum of a vehicle.

Referring to FIG. 3 there is shown in horizontal cross-section the upper portion of a brake drum 8 which is mounted on a rear wheel unit of an automotive vehicle, not shown, and shoes 6 and 7 which are provided inside the drum 8 on opposite sides of an anchor pin 5 which is fixedly mounted on a backplate 4. The shoes 6 and 7 are connected to the anchor pin 5 and normally held out of contact with the interior of the drum 8 by pull-off springs not shown. The ends of the shoes 6 and 7 are connected by a link and shoe-to-shoe spring such as employed in conventional duo-servo brakes. Near to and at an equal distance from the tips of the shoes 6 and 7 there are formed engagement openings 6a and 7a, respectively. The engagement openings 6a and 7a are respectively engaged by a primary lever 10 and a secondary lever 11.

The primary lever 10 is a two-leg lever having the general shaped of a reversed L and comprises an outer leg 10a which is generally parallel to the plane of rotation of the drum 8 and an inwardly directed leg 10b. The inwardly directed leg 10b passes through an opening 4a which is formed in the backplate 4 and is large enough to permit requisite movement, described below, of the primary lever 10 and has a tip end portion 10c which extends into the engagement openings 6a of the shoe 6. When the primary lever 10 is pivoted counterclockwise as seen in the drawing in a manner described below the tip end portion 10c of the inner leg 10b thereof presses against a side of the engagement opening 6a of the shoe 6 and pushes the shoe 6 in the direction indicated by the arrow A in the drawing, away from the anchor pin 5 and into pressure contact with the drum 8. The tip end portion 10a' of the primary lever outer leg 10a is connected to one end of an actuation cable 3.

Figure 4:
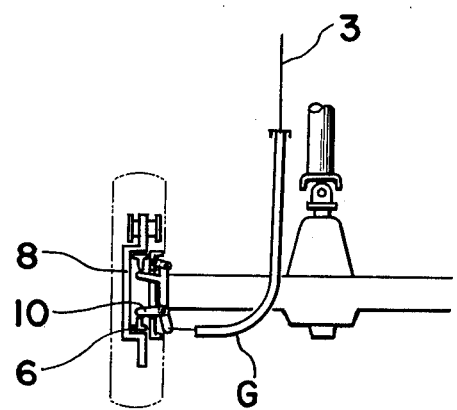
FIG. 4 is a plan view showing the disposition of an actuation cable in a duo-servo brake according to the invention.

Referring to FIG. 4, the actuation cable 3 is led away from the wheel unit on which the drum 8 is mounted along a line generally parallel to the rear axle of the vehicle, and is passed round a guide G provided near a generally central portion of the rear axle whereat there is no encumbrance to or by rear suspension elements of the vehicle. The cable 3 is then led forwards to and is connected to a parking brake handle, for example, provided in the driving compartment of the vehicle. Upon actuation of the brake handle, the actuation cable 3 is caused to move outwards with respect to the drum 8 and forwards towards the driving compartment and causes the primary lever 10 to pivot in a direction to move the shoe 6 into contact with the drum 8. The actuating cable 3 need not, of course, be continuous from the wheel unit to the brake handle but may be constituted by a rear cable extending from the primary lever 10 along a line generally parallel to the vehicle rear axis and, at approximately the location of the guide G, connecting via a yoke or other known connection means to a front cable leading to the brake handle.

Referring back to FIG. 3, the secondary lever 11 has an approximate T-shape and comprises an outermost base portion 11a which is disposed approximately parallel to the plane of rotation of the drum 8 and is spaced further from the drum 8 than the outer leg 10a of the primary lever 10. The secondary lever leg 11b constitutes a straight extension to the base portion 11a, on the side thereof opposite to the primary lever 10. The leg 11c of the secondary lever 11 is disposed at approximately right-angles to the base portion 11a and leg 11b, extends inwardly toward the drum 8 interior, passes through an opening 4b which is formed in the backplate 4 and is large enough to permit requisite movement of the secondary lever 11. The end portion 11c' of the leg 11c extends into the abovementioned opening 7a formed in the shoe 7.

The surfaces of the end portions 10c and 11c' of the primary lever leg 10b and secondary lever leg 11c which face the drum 8, i.e., the left surface of end portion 10c and right surface of end portion 11c' as seen in the drawing, are suitably shaped to effect full-surface contact with the left surface and right surface of the shoe opening 6a and shoe opening 7a, respectively, when the lever legs 10b and 11c are moved away from the anchor pin 5, to move the shoes 6 and 7 into contact with the drum 8. The openings 6a and 7a formed in the shoes 6 and 7 may be large enough to allow a certain amount of play of the end portions 10c and 11c' of the lever legs 10b and 11c, as shown in FIG. 3, or may only be large enough to permit exact engagement of the end portions 10c and 11c' therein.

The leg 11d of the secondary lever 11 is inclined with respect to the base portion 11a, extends obliquely inwards towards the drum 8 and the end portion thereof overlaps the junction 10d of the legs 10a and 10b of the primary lever 10. The end portion of the secondary lever leg 11d and the junction 10d of the primary lever 10 are both in rotatable attachment to a connecting pin 12, which is not attached to any other portions of the brake assembly.

The junction of the inclined leg 11d and the base portion 11a of the secondary lever 11 is connected by a pin 18 to the outer end 13b of a first short link lever 13, the pin 18 being unattached to other portions of the brake assembly and both the secondary lever 11 and the link lever 13 are freely rotatable about the pin 18. The inner end 13a of the link lever 13 is in rotatable attachment to a pin 14 which is fixedly attached to a bracket 5a which extends outwardly from and is in fixed attachment to the anchor pin 5.

The leg 11b of the secondary lever 11 is connected to the outer end 16b of a second short link lever 16 by a pin 19, which, like the pin 18, is unattached to brake assembly portions, and permits free rotation of the secondary lever 11 and second link lever 16. The inner end 16a of the second link lever 16 is rotatably mounted on a fixed pin 17 mounted on a mounting bracket 15 which is in welded or similar fixed attachment to the backplate 4.

Attachment of the various levers to the pins 12, 18, and 19, which as is evident from the above description are moveable, is suitably made by retaining rings below which are provided wave washers for example, and the fixed pins 14 and 17 are held in place by cotter pins for example. The levers 10, 11, 13 and 16 are suitably protected from dust by a cover 21 made of rubber or similar flexible material which has edge portions attached to the backplate 4 and bracket 15 and is held in place by a holder 20 fixedly attached to the backplate 4.

The first and second link levers 13 and 16 act as a support to the entire lever assembly, and allow the secondary lever 11 to be moved in a line generally parallel to the plane of rotation of the drum 8. However, since the first and second link levers 13 and 16 are rigid and comparatively short, the secondary lever 11 is moveable only a very short distance towards or away from this plane of rotation. The first and second link levers 13 and 16 are suitably, but not essentially, equal in length and so mounted that they remain parallel at all times.

Still referring to FIG. 3, action of the abovedescribed brake means is as follows. When no pulling force is applied on the cable 3 the brake elements are in the general positions indicated by the solid line portions of the drawing wherein no pressure is applied by the primary lever 10 on the shoe 6 or by the secondary lever 11 on the shoe 7, and the shoes 7 are therefore held out of contact with the drum 8 by pull-off springs not shown, thus permitting rotation of the drum 8 and associated wheel unit. Actuation of the brake handle, not shown, by a driver causes the cable 3 to impose a pull indicated by the arrow P1 on the outer leg 10a of the primary lever 10, the pull P1 being directed outwardly, i.e., away from the drum 8. The primary lever 10 is therefore pivoted counterclockwise as seen in the drawing, this pivotal movement centering on the connector pin 12, and, as indicated by the dotted line portion of the drawing, the primary lever 10 is moved into a position wherein the tip portion 10c of the inner leg 10b thereof pushes against the side wall of the opening 6a in the shoe 6 and forces the shoe 6 into contact with the drum 8.

Simultaneously with this pivotal motion of the primary lever 10, since the primary lever 10 and secondary lever 11 are fixedly attached to the connector pin 12 acting as the pivotal centre of the primary lever 10, the primary lever 10 exerts a turning force on the connector pin 12, and the pin 12 exerts a corresponding force on the inclined leg 11d of the secondary lever 11. This force is imposed on the remaining portions of the secondary lever 11, which as noted above is constrained by the link levers 13 and 16 to move in a line generally parallel to the plane of drum rotation. The secondary lever 11 is therefore moved to the right as seen in the drawing, and the tip portion 11c' of the leg 11c thereof pushes the shoe 7 into pressure contact with the drum 8, thereby completing braking action. During this movement of the secondary lever 11 opposite ends of the first link lever 13 turn about the pins 14 and 18, opposite ends of the second link lever 16 turn about the pins 17 and 19, and the junction of the inclined leg 11d and base portion 11a of the secondary lever 11 and the end of the extension 11b of the secondary lever 11 turn about the pins 18 and 19 respectively. In other words, during actuation of the lever assembly all support and connecting points therein are rotatory, and there is therefore minimum friction and improved efficiency of transmission of the effort of pull P1.

From consideration of the general layout of the brake means according to the invention shown in FIG. 4, it will be apparent that, since the actuation cable 3 is disposed generally parallel to the vehicle axis carrying the wheel unit with which the brake means is associated, in mounting of the cable 3 it is easy to avoid interference with or by suspension elements mounted on or near the wheel unit. In addition, it is evident that since the rear end portion of the cable 3 attached to the primary lever 10 is at approximately a right-angle to the cable portion which connects to a brake actuation handle or pedal and to the plane of rotation of the drum 8, any displacement of the tip portion 10a' of the outer leg 10a of the primary lever 10 which may result from displacement of the shoes 6 and 7 during forward or reverse rotation of the wheel unit has minimum effect on tautness of the actuation cable 3.

The brake means of the invention thus offers the advantages that mounting of the actuation cable 3 is facilitated, and that since there is little variation in the tautness of the actuation cable 3 when the cable 3 is unactuated an equal braking effort applied through a braking handle or pedal results in a generally equal braking force regardless of whether a vehicle is driven forwards or in reverse.

Another principal advantage of the invention is that since connections in and support of the brake actuation lever assembly are all rotatory, there is reduced friction in the actuation lever assembly and hence improved braking effort transmission and reduced wear of parts.

Figure 5:
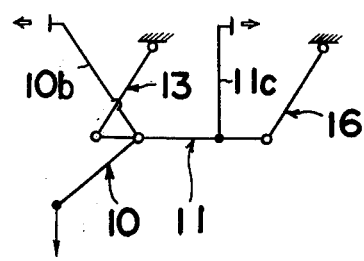
FIGS. 5 and 6 are schematic views of arrangements of shoe actuation link assemblies according to other embodiments of the invention.

According to the invention it is merely necessary to provide the secondary lever and first and second link levers as a four-joint link assembly having two fixed points, and connections need not necessarily be exactly as shown in FIG. 3 and described above. Needless to say, it is not essential that the primary lever 10 be connected to an end point of the secondary lever 11 but other relative dispositions of the levers 10 and 11 are possible. For example, the same results are achieved if, as shown schematically in FIG. 5, the first link lever 13 connects to an end point of the secondary lever 11 and the primary lever 10 connects to a point of the secondary lever 11 between the inwardly directed leg 11c of the secondary lever 11 and the point of connection thereto of the first link lever 13, the second link lever 16 being equal in length to and parallel to the first link lever 13 and connecting to an opposed end portion of the secondary lever 11.

Figure 6:
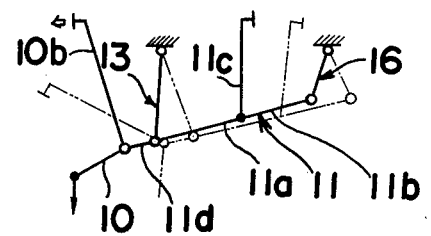

It is not essential that the first link lever 13 and second link lever 16 be equal in length and always remain in parallel, but, if the base portion 11a and extension leg 11b of the secondary lever 11 are generally inclined with respect to the plane of rotation of the drum 8, the link levers 13 and 16 may have different lengths and may be out of parallel during part of the movement thereof in guiding motion of the secondary lever 11, as indicated schematically in FIG. 6, in which the solid line portions show the unactuated position of the brake means, and the dotted line portions show the actuated position of the brake means. Also, of course, although from the point of compactness of construction the primary lever 10 most suitably has a general L shape, the same braking action and advantages may be obtained if the primary lever 10 is any two-leg lever. It will also be understood that although the invention has been described with reference to a duo-servo parking brake means the invention offers the same advantages when employed in association with other types of drum brakes.

What is claimed is:

1. A duo-servo parking brake system for an automotive wheeled vehicle, said system comprising:
    a rigid brake support means;
    a drum rotatably mounted adjacent said support means and having coaxially positioned therearound a wheel unit;
    first and second brake shoes movably supported by said support means within said drum and normally urged to inoperative positions out of contact with said drum, said first and second shoes being connected to each other at first adjacent ends thereof, each said shoe having an opening therethrough;
    an anchor pin fixedly mounted on said support means at a position between second adjacent ends of said first and second shoes;
    a link assembly comprising:
        a. a primary lever having first and second end portions, said first end portion extending through said opening in said first shoe;
        b. a secondary lever having a base portion rotatably connected to said primary lever and a leg portion having a first end portion extending through said opening in said second shoe and a second end portion fixed to said base portion; and
        c. first and second link lever means, each having a first end rotatably connected to said support means and a second end rotatably connected to said base portion of said secondary lever, said first and second link lever means being spaced in the longitudinal direction of said base portion, for supporting and guiding said secondary lever;
    an actuation cable having first and second end portions, said first end portion being connected to said second end portion of said primary lever and extending therefrom in a direction generally parallel to an axis of rotation of said drum; and
    brake actuation means, connected to said second end portion of said actuation cable, for applying a pulling force on said actuation cable and transmitting said force to said link assembly and for causing said first end portion of said primary lever and said first end portion of said leg portion of said secondary lever to move said first and second shoes, respectively, into operative positions thereof in contact with said drum.

2. A system as claimed in claim 1, wherein said openings in said first and second shoes extend through said second adjacent ends thereof on opposite sides of said anchor pin.

3. A system as claimed in claim 2, wherein said primary lever has a generally L-shaped configuration comprising an inner leg extending substantially normal to the plane of rotation of said drum and including said first end portion extending through said opening in said first shoe and an outer leg extending substantially parallel to said plane of rotation of said drum and including said second end portion connected to said actuation cable; said secondary lever has a generally T-shaped configuration; said base portion of said secondary lever extends substantially parallel to said plane of rotation of said drum and is connected to said primary lever at an area of juncture between said inner and outer legs thereof; and said leg portion of said secondary lever extends substantially normal to said plane of rotation of said drum at a position between said first and second link lever means.

4. A system as claimed in claim 1, wherein said primary lever has a generally L-shaped configuration comprising an inner leg extending substantially normal to the plane of rotation of said drum and including said first end portion extending through said opening in said first shoe and an outer leg extending substantially parallel to said plane of rotation of said drum and including said second end portion connected to said actuation cable; said base portion of said secondary lever extends substantially parallel to said plane of rotation of said drum and is rotatably connected to said primary lever at an area of juncture between said inner and outer legs thereof; and said leg portion of said secondary lever extends substantially normal to said plane of rotation of said drum.

5. A system as claimed in claim 4, wherein said secondary lever has a generally T-shaped configuration; and said leg portion of said secondary lever is positioned between said first and second link lever means.

* * * * *